(12) United States Patent
Ikari

(10) Patent No.: US 6,202,501 B1
(45) Date of Patent: Mar. 20, 2001

(54) STEERING APPARATUS

(75) Inventor: Masanori Ikari, Sayama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/304,852

(22) Filed: May 5, 1999

(30) Foreign Application Priority Data

May 8, 1998 (JP) .................................................. 10-142108

(51) Int. Cl.[7] .............................. B62D 1/14; B62D 1/12; B60N 2/46
(52) U.S. Cl. ............................... 74/496; 74/545; 180/6.3; 180/332; 297/411.36; 297/411.37
(58) Field of Search ..................... 74/496, 545; 180/6.28, 180/6.3, 6.5, 332, 402; 297/411.35, 411.36, 411.37

(56) References Cited

U.S. PATENT DOCUMENTS

| | | | |
|---|---|---|---|
| 2,730,182 | * 1/1956 | Sloane | 180/6.44 |
| 2,978,053 | * 4/1961 | Schmidt | 180/12 |
| 3,283,609 | * 11/1966 | Waters | 74/545 |
| 4,403,673 | * 9/1983 | Ball | 180/214 |
| 4,702,520 | * 10/1987 | Whisler et al. | 297/411.36 |
| 5,263,901 | * 11/1993 | Kawakami et al. | 180/6.48 |
| 5,749,629 | * 5/1998 | Heath et al. | 297/411.36 |

* cited by examiner

Primary Examiner—Allan D. Herrmann
(74) Attorney, Agent, or Firm—Armstrong, Westerman, Hattori, McLeland & Naughton, LLP

(57) ABSTRACT

A steering apparatus with excellent operability, which is especially excellent in minute steering operability, is provided. For this purpose, the apparatus includes a steering operation shaft (6) rotating almost horizontally, and a lever (3) which is coupled to the steering operation shaft (6), separated by a predetermined horizontal distance from the steering operation shaft (6), and which turns almost horizontally to rotate the steering operation shaft (6).

10 Claims, 3 Drawing Sheets

STEERING APPARATUS

TECHNICAL FIELD

The present invention relates to a steering apparatus for a construction vehicle.

BACKGROUND ART

Conventionally, a steering wheel method and a joystick lever method have been known as steering methods of construction vehicles. In the steering wheel method, an operator turns a steering wheel provided at a driver's seat, thereby obtaining a steering angle almost proportional to the turning angle, and the maximum turning angle is, for example, two or three turns respectively to the right and left. According to the steering wheel method, a steering angle corresponding to a turning angle is obtained, therefore enabling a fine steering operation. In addition, a construction vehicle can be driven with the same feeling as in driving a car, which makes it easy to travel.

Meanwhile, in the joystick lever method, an operator tilts a joystick lever provided at a driver's seat, thereby obtaining a steering speed (changing speed of a steering angle) which is almost proportional to the tilting angle. The maximum tilting angle is the maximum angle of turning the wrist respectively to the right and left, thereby enabling an operation with one hand. Consequently, it is easy to travel while operating a working machine.

The conventional steering methods as described above, however, have the following disadvantages. In the steering wheel method, a larger turning angle is required in order to obtain a larger steering angle, which becomes one of the reasons for causing fatigue of the operator in a construction vehicle requiring frequent switching of the steering. When traveling during an operation, it is necessary to operate a steering wheel with one hand, which causes the disadvantage of the steering operation being very difficult.

In the joystick method, a steering speed almost proportional to the tilting angle of a joystick lever is obtained, and therefore in a situation in which a lever is tilted, the steering is turned too much. For this reason, each time when a steering angle reaches a target steering angle in one steering operation, it is necessary to return the joystick lever to a neutral position so that the steering speed recovers to 0 (zero). In addition, when the steering angle is further returned to the straight-ahead position, it is necessary to carry out the same operation as above in the reverse direction. Accordingly, the number of operations increases, thereby increasing the workload on the operator. Further, in order to operate the steering at a minute steering angle, it is necessary to continuously operate the lever in a minute tilting angle range in the reverse directions in a short time, therefore making the operation extremely difficult, and the steering tends to be unstable.

SUMMARY OF THE INVENTION

Paying attention to the aforesaid disadvantages, the present invention is made, and its object is to provide a steering apparatus with excellent operability, which is especially excellent in a minute steering operation A steering apparatus according to the present invention is a steering apparatus for a construction vehicle, and is characterized by including
  a steering operation shaft rotating almost horizontally, and
  a lever which is coupled to the steering operation shaft, separated by a predetermined horizontal distance from the steering operation shaft, and which turns almost horizontally to rotate the steering operation shaft.

According to the above configuration, the steering operation shaft is rotated by means of the lever which is horizontally separated by a predetermined distance from the steering operation shaft, therefore it is easy for an operator to feel the degree of the horizontal rotational angle as a quantity of the steering operation. Accordingly, a fine-tuning of the operating quantity is enabled by slightly moving the lever.

Further, the steering operation shaft may be positioned almost beneath the wrist of the operator when the operator grips the lever. According to the configuration, the steering operation shaft is positioned almost beneath the wrist when the operator grips the lever, and therefore the lever is turned around the wrist. Thereby, the operability of the steering, especially the operability in a minute operation is improved.

Furthermore, an arm rest, on which the operator fixes his or her elbow or arm when the operator grips the lever, may be included. According to the configuration, a steering operation can be performed in a stabilized state with his or her elbow or arm being fixed on the arm rest, therefore the operability in steering is improved.

Further, the positions of the lever and the arm rest may be adjustable at least either in an almost horizontal direction or in a vertical direction, relative to an operator seat in which the operator sits. According to the configuration, the positions of the lever and the arm rest are adjustable in an almost horizontal direction and/or a vertical direction, relative to the operator seat in which the operator sits, therefore the lever and the arm rest can be adjusted corresponding to the physical constitution of the operator. Accordingly, the operator can steer in a natural posture, therefore improving the operability of the steering.

In addition, it is suitable to further include a pilot valve which is disposed almost beneath the steering operation shaft, with an input shaft and a feedback shaft being provided on a concentric axis, and which outputs pilot hydraulic pressure almost proportional to the deviation angle of the rotational angle of the input shaft and the rotational angle of the feedback shaft to control the steering angle of the construction vehicle, and coupling means for coupling the steering operation shaft and the input shaft so that the steering operation shaft is movable horizontally and vertically relative to the input shaft.

According to the above configuration, the steering operation shaft and the rotating shaft of the pilot valve are coupled by the coupling means so that the steering operation shaft is movable horizontally and vertically relative to the rotating shaft of the pilot valve. Accordingly, even if the lever and the steering operation shaft are moved correspondingly to the physical constitution of the operator, or the like, the rotational angle of the steering operation shaft can be transmitted to the rotating shaft of the pilot valve by the coupling means. Thereby, the operator seat and the steering operation shaft can be moved to a position at which the operator comfortably carries out the operation, therefore improving the steering operability.

Furthermore, the input shaft and a rotational axis of the steering operation shaft may be disposed almost in parallel. According to the configuration, the rotating shaft of the pilot valve and the rotational axis of the steering operation shaft are almost in parallel, therefore enabling to simplify the configuration of the coupling means for transmitting the rotation of the steering operation shaft to the pilot valve, and to effectively transmit the rotation of the steering operation shaft.

Further, the steering angle may be almost proportional to the rotational angle of the steering operation shaft. According to the configuration, the steering angle is controlled to be almost proportional to the rotational angle of the steering operation shaft (namely, the operating angle of the lever), therefore eliminating a need to return the lever to the central position when the steering angle reaches a target steering angle. Thereby, the number of operations is reduced, therefore reducing the fatigue of the operator. In addition, the steering speed does not change relative to the operating angle of the lever, therefore enabling a stable steering operation. Further, the rotational angle and the rotational direction of the steering operation shaft can easily correspond to the steering angle and the steering turning direction. Thereby, the operator has immediate and clear feeling of the steering operation, therefore facilitating the steering operation.

Furthermore, the changing speed of the steering angle may change in response to the speed of the construction vehicle. According to the configuration, in response to the speed of the construction vehicle, the changing speed of the steering angle is changed. For example, during traveling at high speed, when the steering angle is too large, or the steering is turned too abruptly, an unstable traveling condition such as slide slipping, which is caused by abrupt steering, occurs. Accordingly, in this situation, the changing speed of the steering angle is decreased, thereby preventing the above unstable condition and enabling stable traveling.

A steering box with the steering operation shaft being disposed inside thereof may be included, and the lever may project from a hole in a circular arc form, which is provided on the top surface of the steering box.

According to the above configuration, the lever is projected from the hole in a circular arc form, which is provided on the top surface of the steering box, therefore making it easy for the operator to know the degree of the steering angle from the position of the lever relative to the hole in a circular arc form. Accordingly, though the operator cannot see the actual steering angle, the operator visually knows the steering angle, therefore improving the operability of driving.

BEST MODE FOR CARRYING OUT THE INVENTION

A preferred embodiment of the present invention will be particularly described below with reference to the attached drawings.

Figure 1:
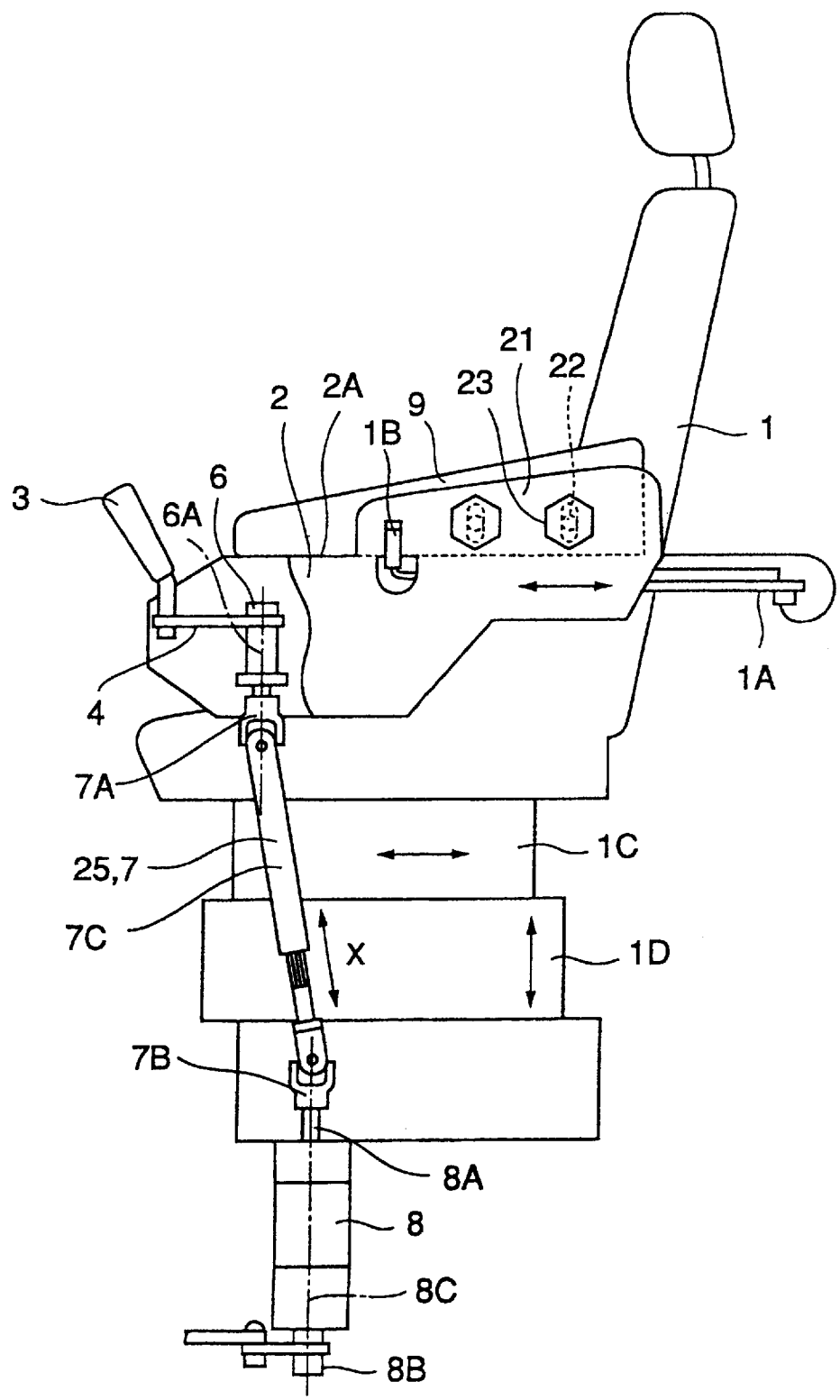
FIG. 1 is an explanatory diagram of a steering apparatus according to an embodiment of the present invention.

In FIG. 1, a steering box 2 is disposed at the side of an operator seat 1 provided on a floor of a driver's cab (not shown) to be movable in a fore-and-aft direction (the rightward and leftward direction in FIG. 1) of a vehicle via a slide rail 1A. The steering box 2 is movable in a fore-and-aft direction relative to the operator seat 1 or fixable thereto by turning a lever 1B provided on the outside thereof. An arm rest 9 is attached on the rear top surface 2A of the steering box 2 so as to be vertically movable. In the present embodiment, a side plate 21 projecting upward at the aforesaid rear top surface 2A is provided on the side surface of the steering box 2, opposite to the side of the operator seat 1. A predetermined numbers of vertically long holes 22 are formed in the side plate 21. Screw holes are formed on the side surface of the arm rest 9 to almost match the positions of the long holes 22, and screws 23 are inserted into the aforesaid screw holes from the outside of the side plate 21 through the long holes 22, thereby making the arm rest 9 vertically movable.

Figure 4:
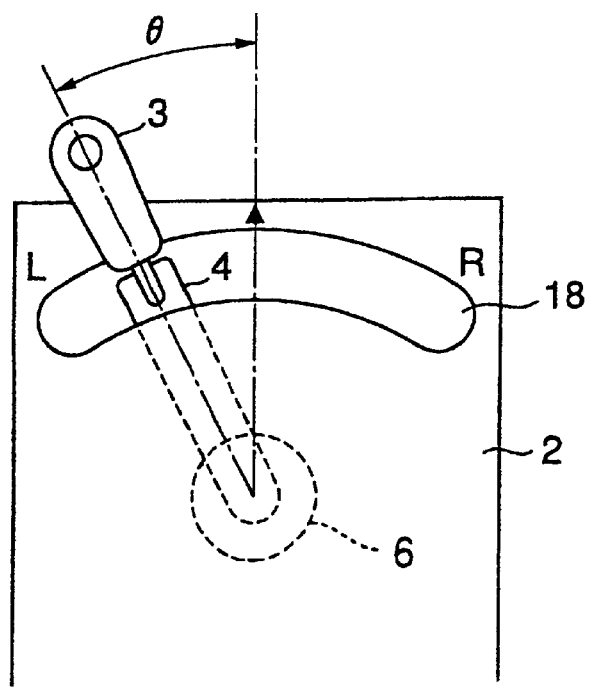
FIG. 4 is a plan view of an area near a lever in FIG. 1.

In the front portion of the steering box 2, a steering operation shaft 6 is provided so as to be rotatable almost horizontally around a rotational axis 6A. A lower end portion of a lever 3 for a steering operation is coupled to the steering operation shaft 6 via a coupling bar 4 in the steering box 2. The upper portion of the lever 3 projects upward via a hole 18 in a circular arc form (see FIG. 4) provided on the top surface of the steering box 2. The steering operation shaft 6 is positioned almost beneath an operator's wrist when the operator grips the lever 3. In this situation, as shown in FIG. 4, an angle to which the lever 3 is turned from the almost center position (namely, a position almost matching a forward direction of the vehicle) in the range where the lever 3 turns around the steering operation shaft 6 shall be a turning angle θ.

A pilot valve 8 is provided at the vehicle body at a position almost beneath the steering operation shaft 6 and below the floor surface of the driver's cab. The pilot valve 8 has an input shaft 8A and a feedback shaft 8B on a concentric axis 8C, and generates pilot hydraulic pressure in response to the deviation angle of the rotational angle of the input shaft 8A and that of the feedback shaft 8B. The rotational axis 6A of the steering operation shaft 6 and the axis 8C of the pilot valve 8 are provided almost in parallel with each other.

The steering operation shaft 6 and the input shaft 8A of the pilot valve 8 are vertically expandable and contractible, and are coupled via a coupling means 7 both end portion of which are horizontally movable relative to each other to transmit the turning angle θ of the steering operation shaft 6 to the pilot valve 8. In the embodiment, a center portion 7C of the coupling means 7 is composed of a universal joint 25 expandable and contractible in a longitudinal direction (the direction shown by the arrow X in FIG. 1). The operator seat 1 is movable vertically and in a fore-and-aft direction by means of a seat slide mechanism 1C and a seat raising/lowering mechanism 1D so that an operator can adjust the position of the operator seat 1 according to his or her physical constitution. Even if the position of the steering operation shaft 6 is moved by means of the seat slide mechanism 1C and the seat raising/lowering mechanism 1D, the turning angle θ is transmitted by the coupling means 7.

The universal joint 25 has the expandable and contractible center portion 7C and joint elements 7A and 7B at both end portions thereof. The joint elements 7A and 7B and the center portion 7C are rotatably coupled when the respective longitudinal directions intersect with one another within a predetermined angle. Thereby, even if the positions of the joint elements 7A and 7B moves horizontally and/or vertically, it is made possible that the turning angle θ of the joint element 7A is transmitted to the joint element 7B. The joint elements 7A and 7B are respectively connected to the steering operation shaft 6 and the input shaft 8A of the pilot valve 8. Thereby, even if the positional relationship between the steering operation shaft 6 and the input shaft 8A of the pilot valve 8 is changed, the turning angle θ of the steering operation shaft 6 can be transmitted to the input shaft 8A of the pilot valve 8.

Figure 2:
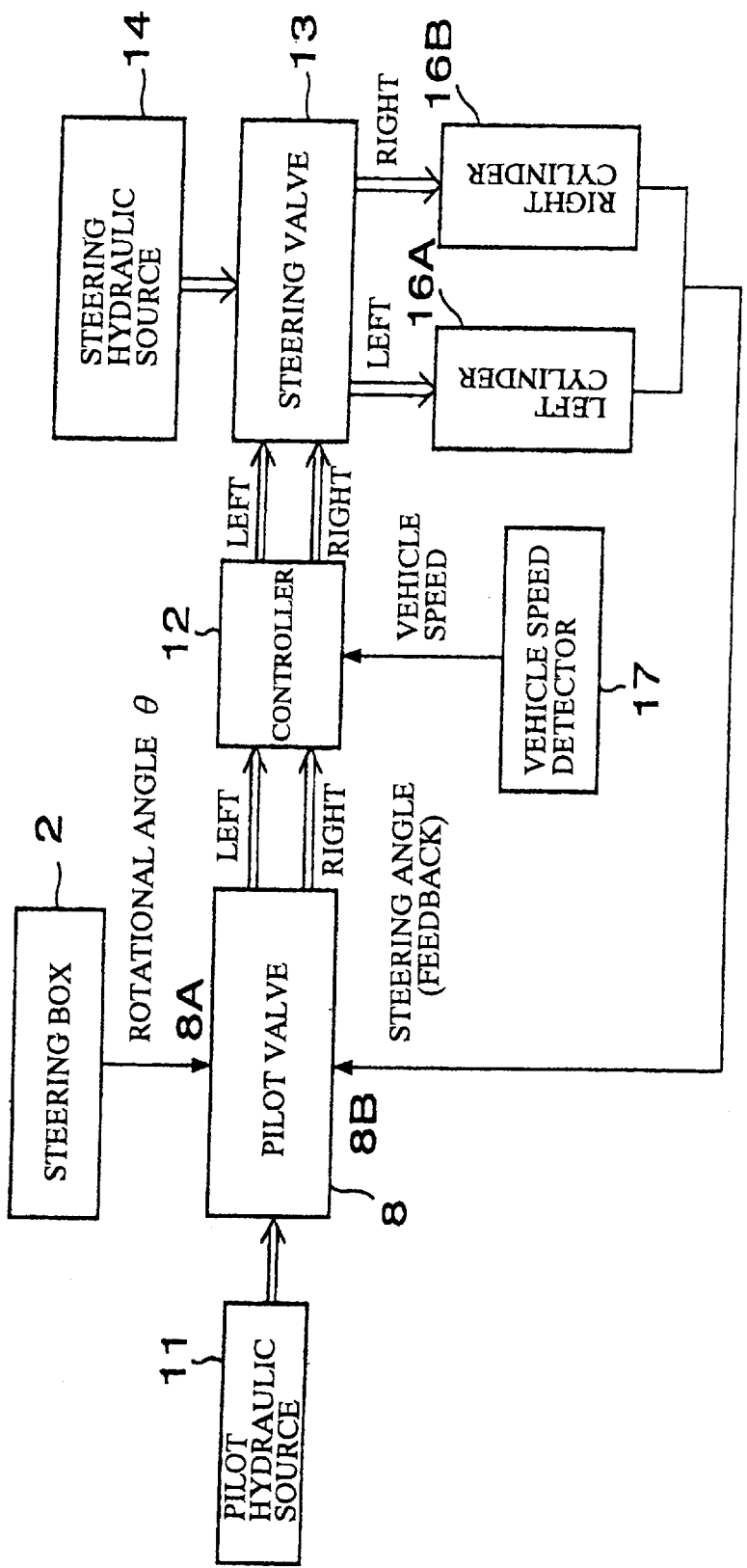
FIG. 2 is a block diagram of a steering angle control means according to the embodiment of the present invention.

Next, an example of a steering angle control means including the pilot valve 8 will be explained with reference to FIG. 2. Here, an articulated type is cited as an example of a steering means. Arrows described by double lines show the transmission of hydraulic pressure.

The steering angle control means includes the pilot valve 8, a pilot hydraulic source 11 for supplying pilot pressure oil to the pilot valve 8, a controller 12 for converting pilot hydraulic pressure outputted from the pilot valve 8 by means of predetermined computation, and a steering valve 13 for controlling a steering angle in response to a pilot hydraulic pressure signal which is converted via the controller 12 by driving right and left hydraulic cylinders 16A and 16B. Further, the steering angle control means includes a steering hydraulic source 14 for supplying main pressure oil to the steering valve 13, the right and left hydraulic cylinders 16A and 16B for operating the articulated type of steering in response to the flow rate of the pressure oil outputted from the steering valve 13, and a vehicle speed detector 17 for detecting the traveling speed of the construction vehicle and outputting a vehicle speed signal to the controller 12. The quantity articulated by the action of the right and left hydraulic cylinders 16A and 16B is fed back to the feedback shaft 8B by means of a mechanical link mechanism (not shown) so that the deviation angle of the input shaft 8A and the feedback shaft 8B is reduced. It should be noted that the articulated quantity is proportional to a steering angle.

The operation of the aforesaid steering angle control means will be explained below. First, in the pilot valve 8 which is at a neutral position at first, the input shaft 8A is rotated in response to the turning angle θ which is transmitted from the steering operation shaft 6 in the steering box 2. Pilot hydraulic pressure occurs almost proportionally to the deviation angle of the input shaft 8A and the feedback shaft 8B at the time when the input shaft 8A is rotated, and is inputted into the controller 12. The controller 12 converts the inputted pilot hydraulic pressure by a predetermined computation, and outputs it to an operation element of the steering valve 13 as a pilot hydraulic signal to expand/contract the right and left hydraulic cylinders 16A and 16B. Based on the pilot hydraulic signal, the steering valve 13 controls the flow rate and the direction of the pressure oil discharged from the steering hydraulic source 14 to expand/contract the right and left hydraulic cylinders 16A and 16B. Thereby, the construction vehicle is steered by articulation. Expanding/contracting quantity (equivalent to a steering angle) of the right and left hydraulic cylinders 16A and 16B is fed back to the feedback shaft 8B by means of the link mechanism not shown. When the steering angle corresponding to the aforesaid turning angle θ is obtained, the output from the pilot valve 8 is stopped to finish the steering control.

Figure 3:
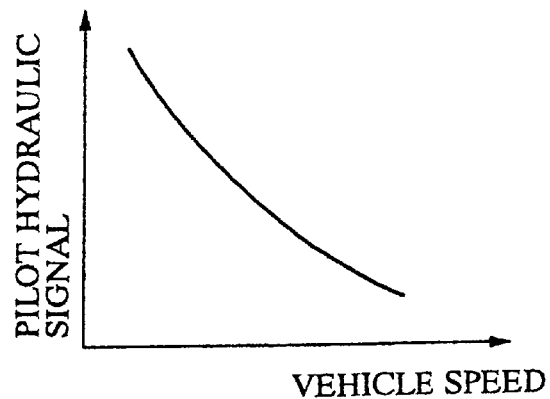
FIG. 3 is an explanatory diagram showing an example of the relationship between a vehicle speed and a pilot hydraulic pressure signal according to the embodiment of the present invention.

At this time, the vehicle speed detector 17 detects a traveling speed of the construction vehicle, and outputs the vehicle speed signal to the controller 12. The controller 12 converts the magnitude of the pilot hydraulic signal outputted from the pilot valve 8 in response to the vehicle speed based on a predetermined relational expression or a computation table. As shown in FIG. 3, for example, when the vehicle speed is in a higher range, the magnitude of the pilot hydraulic signal is reduced, thereby decreasing the changing quantity of the steering angle. The object of the above is to prevent unstable travel, hence if steering is rapidly changed, or a steering angle is increased while traveling at a higher speed, a sharp turn state is brought about, thereby easily causing unstable traveling. The form of the curve shown in FIG. 3 is an example of the aforesaid predetermined relational expression or the computation table, and the present invention is not limited to this form of the curve.

In FIG. 4, the lever 3 is projected diagonally upward from the hole 18 in a circular arc form which is provided on the top surface of the steering box 2, and is allowed to turn horizontally around the steering operation shaft 6. In this situation, the hole 18 in a circular arc form shows a quantity of steering operation in such a manner as to be easily understood. Specifically, the operator immediately understands the present degree of the steering angle of the construction vehicle depending on where the lever 3 is positioned in the hole 18. When the steering is turned fully to the right, the lever 3 is at the right end position of the hole 18, and when the steering is turned fully to the left, the lever 3 reaches the left end position of the hole 18.

Further a visible sign (for example, an arrow) showing straight-ahead travel is given to the center of the hole 18. Visible signs L and R respectively showing a left turn and a right turn are given to the side of the right and left portions of the hole 18. Thereby, the degree of the steering angle can be known even if the steering angle of the vehicle is not actually seen, thereby increasing steering operability. In addition, even in the configuration in which the steering box 2 does not have the hole 18, for example, the configuration in which the steering operation shaft 6 is disposed outside the steering box 2, it goes without saying that steering operability is increased by giving visible signs around the circular-arc-shaped locus on which the lever 3 is turned.

As explained thus far, according to the present invention, an operator sitting in the operator seat 1 can perform a steering operation, gripping the lever 3 with his or her hand with his or her elbow or arm being fixed on the arm rest 9, therefore greatly facilitating the operation with the wrist and the fingers. In this situation, the elbow and the arm are fixed on the arm rest 9, thereby allowing the wrist to be fixed against rolling or pitching of the vehicle body, therefore greatly stabilizing the steering operation. In addition, the rotational axis 6A of the steering operation shaft 6 almost faces a vertical direction, and the aforesaid axis of rotation 6A is positioned almost beneath the wrist of the operator gripping the lever 3, therefore the operator can perform a steering operation by horizontally turning the lever 3 around his or her wrist. Accordingly, a steering operation is enabled by turning the wrist, and only a very small quantity of operation is required, therefore reducing workload of the operator. In addition, the lever 3 is horizontally turned around the steering operation shaft 6 to perform the operation, therefore matching the feeling of turning the steering. Further, a steering angle is controlled in response to the turning angle θ of the steering operation shaft 6, therefore reducing the number of operations compared to the conventional lever operation in which the steering speed is controlled, and stability in steering is excellent even when operating at a minute steering angle.

The steering operation shaft 6 and the input shaft 8A of the pilot valve 8, which inputs the turning angle θ of the steering operation shaft 6 are coupled by the coupling means 7 so that the steering operation shaft 6 is movable horizontally and vertically relative to the input shaft 8A. Thereby, even if the positions of the lever 3 and the steering operation shaft 6 are moved relative to the pilot valve 8 as a result of the position of the operator seat 1 being adjusted, the turning angle θ is surely transmitted to the input shaft 8A.

In the aforesaid embodiment, an example, in which the steering operation shaft 6 and the input shaft 8A are coupled and the hydraulic cylinders 16A and 16B for controlling the steering angle are driven by the pilot valve 8 via the steering valve 13, is shown, but the present invention is not limited to this configuration. That is, if only the small controlled flow rates of the hydraulic cylinders 16A and 16B are desired, the flow rates of the hydraulic cylinders 16A and 16B may be directly controlled by the pilot valve 8 to obtain a steering angle almost proportional to the turning quantity of the lever 3.

What is claimed is:

1. A steering apparatus for a construction vehicle, comprising:

a steering operation shaft rotating almost horizontally; and a lever which is coupled to said steering operation shaft, separated by a predetermined horizontal distance from said steering operation shaft, and which turns almost horizontally to rotate said steering operation shaft, wherein the position of said lever is adjustable at least in a substantially horizontal direction, relative to an operator seat in which the operator sits.

2. The steering apparatus in accordance with claim 1, wherein said steering operation shaft is positioned almost beneath the wrist of an operator when the operator grips said lever.

3. The steering apparatus in accordance with claim 1, further comprising:

an arm rest on which the operator fixes his or her elbow or arm when the operator grips said lever.

4. The steering apparatus in accordance with claim 3, wherein the position of said arm rest is adjustable at least in one of a substantially horizontal direction and a substantially vertical direction, relative to an operator seat in which the operator sits.

5. The steering apparatus in accordance with claim 1, further comprising:

a pilot valve which is disposed almost beneath said steering operation shaft, with an input shaft and a feedback shaft being provided on a concentric axis, and which outputs pilot hydraulic pressure almost proportional to the deviation angle of the rotational angle of said input shaft and the rotational angle of said feedback shaft to control the steering angle of said construction vehicle; and coupling means for coupling said steering operation shaft and said input shaft so that said steering operation shaft is movable horizontally and vertically relative to said input shaft.

6. The steering apparatus in accordance with claim 5, wherein said input shaft and a rotational axis of said steering operation shaft are disposed almost in parallel.

7. The steering apparatus in accordance with claim 5, wherein said steering angle is almost proportional to the rotational angle of said steering operation shaft.

8. The steering apparatus in accordance with claim 5, wherein the changing speed of said steering angle changes in response to the speed of said construction vehicle.

9. The steering apparatus in accordance with claim 1, further comprising:

a steering box with said steering operation shaft being disposed inside thereof, said lever projecting from a hole in a circular arc form, which is provided on the top surface of said steering box.

10. The steering apparatus in accordance with claim 1, further comprising:

a steering box provided on a side surface of said operator seat movable at least in either one of a substantially vertical direction or a fore-and-aft direction of a vehicle, said lever being provided at said steering box.

* * * * *